Oct. 1, 1940.    S. RICCIO ET AL    2,216,297
VEHICLE SANDER
Filed Nov. 30, 1939    2 Sheets-Sheet 2

Inventors
Stephen Riccio
Walter P. Johnson
By Ernest F. Mechlin
Attorney

Patented Oct. 1, 1940

2,216,297

UNITED STATES PATENT OFFICE 2,216,297

VEHICLE SANDER

Stephen Riccio, Melrose Park, and Walter P. Johnson, Aurora, Ill., assignors to Graham-White Sander Corporation, Roanoke, Va., a corporation of Virginia Application November 30, 1939, Serial No. 306,948

9 Claims. (Cl. 291—15)

The invention relates to a brake and sanding apparatus particularly for use with railway vehicles.

The weight of railway vehicles has been materially reduced in recent years, thereby decreasing the rail load and permitting a power unit of given capacity to pull a greater number of cars or travel at an increased rate of speed over that heretofore attained. In reducing the weight of a vehicle several problems have arisen, one of which is caused by a considerable diminution in the coefficient of adhesion between the vehicle wheels and rail being effected.

It is well recognized that while a railway vehicle is traveling at a great rate of speed the coefficient of friction between the brake shoe and the engaging portion of a vehicle wheel is considerably less than the coefficient of friction between these same engaging parts when the railway vehicle is running at a reduced rate of speed. It is quite conceivable, therefore, that upon a severe, or substantially so, application of the brakes while the vehicle is progressing at a given rate of speed and the wheel speed is being reduced, the coefficient of friction between the brake shoe and wheel may easily exceed the coefficient of adhesion between the wheel and rail. This condition may result in the wheel being substantially or totally locked against rotative movement and the wheel frictionally engaging the rail. Since there is but a line contact between the wheel and rail, as opposed to an appreciable surface contact between the brake shoe and wheel, the above set forth conditions, created in a moving vehicle, will cause the wheel to slide relatively to the rail and to wear a plane surface on the wheel at the point of contact with the rail, commonly termed a flat spot, which may render the wheel unfit for continued service.

It should be noted that certain companies engaged in the production of light weight trucks have substituted for the brake shoe, so long used by the railroads, disk brakes. Disk brakes are decidedly more effective than the old brake shoes and, therefore, they result in the gripping of the wheels and increasing the tendency of the wheels to slide.

It is, therefore, an object of the present invention to provide a means whereby, at certain predetermined speeds of a railway vehicle, the coefficient of adhesion between the wheel and rail may be approximately balanced with or perhaps made greater than the coefficient of friction between a brake shoe and the wheel.

Another object of the invention is the provision, in a brake apparatus of a railway vehicle, of a sanding apparatus which may be selectively and automatically operated to deliver sand at a wheel and rail contact.

A further object of the invention is to provide an automatically operated sanding apparatus or system which is controlled by the speed of the vehicle and pressure of the fluid delivered to the brake cylinder.

A further object of the invention is to provide means for testing the sanders (when the car is standing still) on cars equipped with automatic sanders for sanding during emergency and/or heavy service brake applications.

A more detailed object of the invention is to provide a plurality of means coupled in series to actuate a control means whereby sanding may be effected.

The above as well as numerous other objects of the invention will become apparent from the succeeding description which is to be considered together with the accompanying drawings in which.

Figure 1:
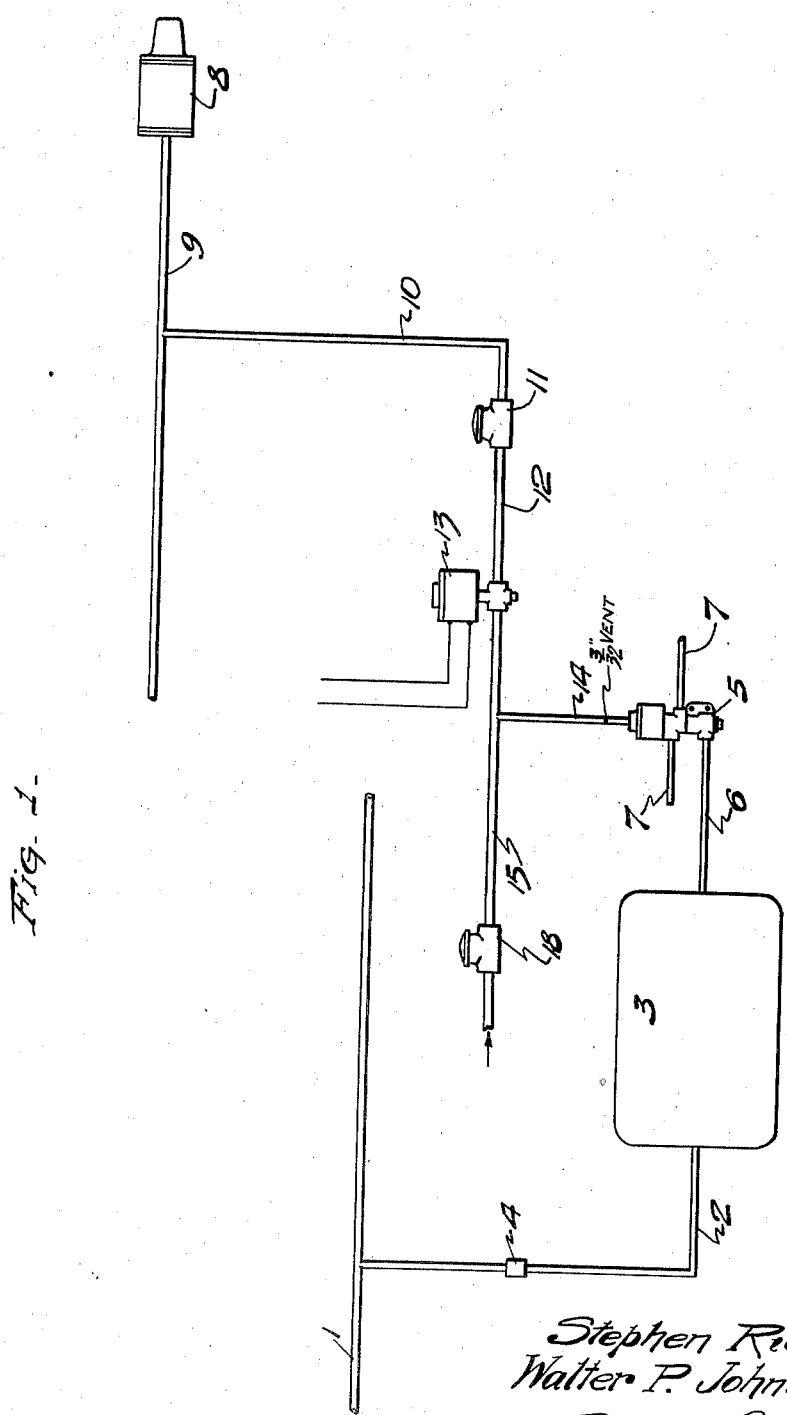
Figure 1 is a schematic arrangement of one exemplification of the present invention.

Before describing the invention in detail it is advisable to point out that in applying the sanding mechanism to cars used for high speed service with speed governor control (Fig. 2) it is essential that the electrical circuit controlling the solenoid valve be rendered inoperative not only during the period in which the cars may be moving at low speeds but also at times when the cars are standing still and it is desirable to test the sanding mechanism independently of the operation of the speed governor control. It is also essential to provide means by which the circuit to the control valve may be controlled by the E. M. F. of the generator (Fig. 3) so as to cause this circuit to be closed above certain speeds but open below certain speeds with means for closing the circuit independently of the generator.

Referring now in detail to the drawings wherein like reference characters designate like parts, the numeral 1 is employed to indicate a section of brake pipe or train line which extends, preferably without interruption, throughout an individual railway vehicle, serving to supply the supply reservoir and emergency reservoir on each car, and, when coupled with train lines of successive or associated vehicles, forms a conduit for fluid under pressure extending from a source of supply, most generally contained in a power unit (not shown), to the rearmost or ultimate vehicle in the train. Leading from and connecting with the brake pipe or supply reservoir is a branch pipe 2 joining the brake pipe or supply reservoir with a sanding reservoir 3 forming a storage means for a readily accessible supply of fluid under pressure. Positioned in the branch pipe between the brake pipe or supply reservoir and sanding reservoir is a check means or valve 4 which is provided with a small port, for example three thirty-seconds of an inch, which forms an intermediate means for permitting fluid to pass from the brake pipe or supply reservoir to the sanding reservoir, and said valve may also be arranged to arrest the fluid built up in the reservoir from escaping therefrom back to the brake pipe or supply reservoir if and when the pressure of the fluid in the latter has been reduced or diminished to a degree which will be less than the pressure of the fluid within the reservoir.

An automatic valve or sanding control means 5 is provided in the apparatus and is in direct communication with the reservoir by means of the conduit 6. The automatic valve, subjected to fluid under pressure from the reservoir, is preferably of a type disclosed and claimed in Patent No. 1,581,546, granted to W. L. Ranson on April 20, 1926, whereby fluid under pressure may selectively pass therethrough to the lead pipes 7. The lead pipes are connected to sand traps (not shown), and are arranged and constructed so as to be instrumental in delivering a flow of sand at the juncture formed by the contacting portion of a vehicle wheel and a rail. By means of the thus far described assembly, sand may be delivered to a rail in the path of an oncoming wheel so that upon an application of the brakes the coefficient of adhesion between the wheel and rail may approximate or be in excess of the coefficient of friction between the wheel and brake shoe.

To prevent a continuous application of sand to the rails, means has been provided to arrest the flow of pressure through the control means 5, and while various arrangements and devices may be employed, preference is herein given to a plurality of devices, coupled in series, actuated by fluid pressure and the speed of the vehicle. Because of this association the control means will be actuated to permit a flow of fluid therethrough to result in a sanding operation only at or beyond a given speed of the vehicle and above a predetermined brake cylinder pressure. Accordingly, the apparatus includes a brake cylinder 8 having leading thereto a brake cylinder pipe 9 which conveys fluid under pressure from a reservoir (not shown) to actuate the brake cylinder and result in a mechanical arrangement being actuated to apply a braking power to the wheels.

Leading from the pipe 9 is a section of pipe 10 which leads to a pressure valve 11 of any type but is desirably arranged so as to be resiliently actuated in forming a barrier for the passage of fluid under a predetermined pressure. That is to say, unless the pressure of the fluid in the pipe 9 exceeds a certain intensity, the pressure valve 11 forms a definite stop against the flow of fluid therethrough. This has been arranged so that spaced and periodic brake applications, such as those introduced when a vehicle is descending a grade to check the progress of the vehicle or preserve a desired vehicle speed, will not result in a sanding of the rails since, during such braking applications, the previously referred to coefficient of friction rarely exceeds the coefficient of adhesion between the wheel and the rail.

Figure 2:
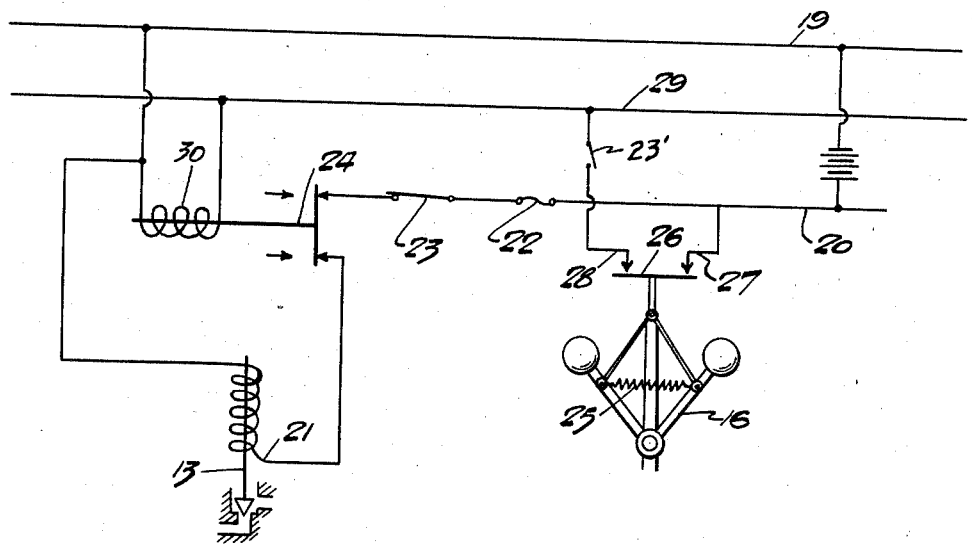
Figure 2 is a diagrammatic view illustrating the electrical circuit for use with the solenoid valve 13 on cars equipped with speed governor control.
Figure 3:
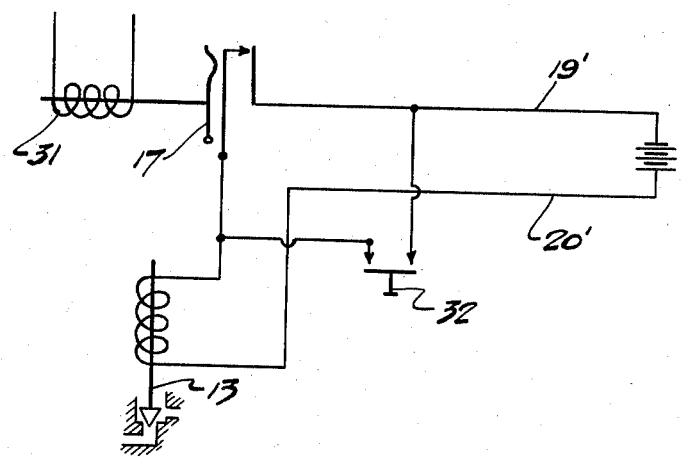
Figure 3 is a similar view illustrating the electrical circuit from the generator cutout and means for short circuiting said circuit and energizing the solenoid valve 13 for testing the sanders when car is standing still.

Coupled in series with the pressure valve through the medium of a pipe 12 is a solenoid valve 13 which may be controlled by a speed governor such as shown at 16 in Figure 2 or by a pivoted electrically operated switch 17, as shown in Figure 3. In fact, this valve may be operated in a variety of ways, it being only necessary to provide means by which the valve will be closed when the train or car is standing or is moving at low speeds, the valve 13 being adapted to be open during the normal train operation at speeds in excess of a given minimum and being operable at will, but not automatically, when the train or car is standing, for test purposes.

The pressure valve 11, positioned on the air lines 10 and 12, also serves as a check against the passage of fluid should the emeregency brake be operated with the accompanying pressure in the pipe line 15 for the operation of the sander valve 5. There is also provided in the line 15 a check valve 18 which permits the free passage of air toward the sander valve but presents the air pressure from the normal operation of the brake cylinder 8 from escaping through the pipe 15.

By associating the pressure valve 11 with the solenoid valve 13 and arranging these valves in series, neither of these mechanisms will operate until the pressure on the valve 11 has reached a predetermined intensity and the train has reached a predetermined speed, and then the fluid in the sanding reservoir is permitted to enter the control means (valve 5) and effect the sanding of the rail upon the normal application of the brakes. The valve 13 is, of course, in communication with the sanding valve 5 through the pipe 14, and it is only when the stated conditions have been met that the fluid under pressure will actuate the sanding control means to permit the fluid from the sanding reservoir to enter the pipes 7 to effect both the sanding and cleaning operations.

The pipe 14 is preferably provided with a vent port which may be from one-thirty-second to three-thirty-seconds of an inch in diameter so as to permit the air which may be trapped in said line to be vented to the atmosphere after each operation so that valve 5 may close.

It will be observed that the pipe 15, which leads from the emergency brake cylinder, is not provided with a spring-pressed plunger, such as 11, nor has it a solenoid valve, such as 13. It will thus be apparent that upon emergency application of the brake the check valve 18 offers no obstruction to the passage of the fluid through the pipe 15 and the pipe 14 to the actuating cylinder of the sander valve 5 causing an operation of the sanding mechanism simultaneously with the application of the emergency brake, thus providing for the sanding of the rails and the increase in the coefficient of adherence between the rails and wheels at the instant the brakes are applied in an emergency.

Where the control valve 5 is normally held in closed position by spring and fluid pressure means, as illustrated in the Ranson patent, supra, the spring controlled check valve 11 may be omitted and a simple check valve substituted therefor provided that the spring in the valve 5 is adjusted to the proper tension so that the valve 5 will not operate until the pressure in the brake cylinder has reached a predetermined minimum. In this construction the valve 11 would act as a simple check valve to prevent the actuating air, in emergency brake application, from passing from the pipe 12 into the pipe 10 and through the latter to the pipe 9 and brake cylinder 8 since the flow under these circumstances might unbalance and detrimentally affect the action of the braking system.

Referring to the diagram illustrated in Figure 2, the wires 19 and 20 represent the normal battery circuit, the wire 19 leading to the solenoid valve for its operation and the wire 20 being connected to the opposite end of the solenoid coil, as clearly indicated at 21. In the wire 20 we preferably interpose at a suitable point a fuse 22 and a manual switch 23. 24 is an electrical switch adapted to be normally closed. The speed governor 16, by reason of the spring 25, causes the contact arm 26 at low speeds, to remain in contact with the contact points 27 and 28, the contact 27 being connected to the wire 20 and the contact 28 to what might be termed a low speed circuit wire 29, the latter being connected to one end of the solenoid 30 controlling the operation of the electrical switch 24, the opposite end of said solenoid being connected to the wire 19. It will be apparent, therefore, that if the train or car is traveling in low governor speed or standing still the contact 26 completes the circuit through the solenoid 30, breaking the circuit through the wires 19, 20 and 21, causing the valve 13 to close.

As soon as the train or car reaches a predetermined speed the governor 16 will cause the contact 26 to be withdrawn from and break the circuit through the wires 20, 29 and 19 and restore the circuit through the wires 19, 20 and 21, and hence cause the switch 24 to close since the solenoid 30, upon the breaking of the first circuit, will cease to operate and the switch 24 will automatically close. The manually operated switch 23 is used to break the circuit through the wires 19 and 20 when it is desired to test the sanding mechanism or cut out the sanding mechanism.

If the cars to be sanded are equipped with speed governor control and the parts are arranged as shown in the diagram of Figure 2 and it is desired to test the sanding mechanism when the train is standing still and the speed governor has broken the circuit 20 to 21, thereby closing the solenoid valve 13, as described above, it is necessary that the speed governor circuit be thrown out of low speed, either by opening a switch 23' or in any other way, so as to thereby re-establish the circuit 19, 20 and 21, which can then be controlled manually by the operation of the switch 23 for testing the sanders. The breaking of the circuit by means of the switch 23' or any other suitable means, of course, nullifies the completion of the circuit through the switch 26. After completing the test of the sanders the switch 23 will be left open until the car is operated. Then the switch 23 may be closed again, making the circuit ready for normal train operation.

Figure 3 is a diagram of an arrangement in which the E. M. F. from the generator operating through the coil or solenoid 31 causes the switch 17 to close the circuit through the wires 19' and 20', thus energizing its solenoid and opening the valve 13. Upon a drop in the speed of the train or car with the consequent reduction in the amount or intensity of the E. M. F., the switch 1 is moved away from and causes the circuit through 19' and 20' to be broken, deenergizing the solenoid controlling the valve 13, and hence closing the same.

In the train operation if the parts are arranged as shown in the diagram of Figure 3 and it is desired to test the sanding mechanism when the train speed is insufficient to establish the circuit 19', 20', it is only essential to operate the switch 32 which, as will be observed, shorts out the circuit switch 17 and completes the circuit 19', 20' through the solenoid, and hence opens the valve 13.

The above description and the accompanying drawings are to be considered merely as illustrative and not by way of limitation, and it will, therefore, be understood that various changes and alterations may be made thereto without departing from within the spirit and scope of the appended claims.

We claim:

1. In a vehicle brake and sanding apparatus, the combination with fluid pressure actuated brakes, of means for actuating said brakes, sanding means, means for controlling the flow of fluid pressure to said sanding means, a reservoir communicating with said sanding means through said controlling means, and a plurality of means for selectively actuating said controlling means, some of said selective means including a plurality of valves in series interposed between said brake actuating means and controlling means, said valves opening respectively under predetermined conditions of pressure from said brake actuating means and vehicle speed and being adapted when open and upon the normal actuation of said brakes to admit fluid under pressure to actuate said controlling means so that fluid under pressure in said reservoir will effect the sanding operation.

2. In a vehicle brake and sanding apparatus, the combination with fluid pressure actuated brakes including a brake cylinder, of sanding means, means for controlling the flow of a supply of fluid to said sanding means, valve means responsive to the speed of said vehicle interposed between said brake cylinder and controlling means, valve means adapted to open in response to a predetermined fluid pressure in said brake cylinder and disposed between said brake cylinder and speed responsive valve means, said last named valve means when open upon a normal application of said brakes being adapted to admit fluid pressure to said speed responsive valve means and said speed responsive valve means when open being adapted to admit fluid pressure to said controlling means.

3. In a vehicle brake and sanding apparatus, the combination of braking means including a brake cylinder, of sanding means removed from said brake cylinder, and means interposed between said sanding means and cylinder for controlling the flow of a supply of fluid to said sanding means for actuating the same, a plurality of valve means coupled in series between said cylinder and controlling responsive respectively to the speed of said vehicle and to fluid pressure for permitting the actuation of said controlling means upon the application of said braking means when said vehicle is moving at a rate of speed in excess of a predetermined minimum and said brake cylinder pressure exceeds a predetermined minimum.

4. In a vehicle brake and sanding apparatus, the combination with braking means including a brake cylinder, of sanding means, and means between said brake cylinder and sanding means for controlling the flow of fluid to said sanding means, a reservoir communicating with said controlling means, a plurality of valve means in series and interposed between said brake cylinder and said controlling means, said valve means being respectively responsive to the speed of said vehicle and to fluid pressure in said brake cylinder whereby the speed of said vehicle and the fluid pressure in said brake cylinder have attained predetermined proportions said control means will be actuated to admit fluid from said reservoir to effect the sanding operation upon the normal actuation of said brake cylinder.

5. In a vehicle brake and sanding apparatus, the combination with fluid pressure actuated brakes, of sanding means, means for actuating said brakes, means interposed between said brake actuating means and sanding means for controlling the flow of fluid pressure to said sanding means, a reservoir communicating with said controlling means for supplying fluid under pressure to said sanding means, check means interposed between a source of fluid under pressure and said reservoir for preventing the flow of fluid from said reservoir toward said supply source, and a plurality of valve means in series and respectively responsive to a predetermined speed of said vehicle and to a predetermined pressure in said brake actuating means whereby when said predetermined speed and pressure have been attained the normal brake application will cause the actuation of said controlling means to permit the reservoir fluid to actuate the sanding means.

6. In a vehicle brake and sanding apparatus, the combination with fluid pressure actuated brakes including a brake cylinder, of sanding means, means for controlling the flow of a supply of fluid to said sanding means, valve means responsive to the speed of said vehicle, valve means responsive to the fluid pressure from said brake cylinder, both of said valve means being interposed between said brake cylinder and said controlling means, both of said valve means, when open, being adapted to permit the actuation of said controlling means upon normal application of said brakes.

7. In a vehicle brake and sanding apparatus, the combination with fluid pressure actuated brakes including a brake cylinder, pressure means for actuating said brake cylinder upon application of the brakes, and pressure means for actuating said cylinder upon an emergency brake application, of sanding means including a control valve, said valve being operable by pressure from said emergency braking pressure source and from said brake cylinder pressure source, a plurality of valve means in series interposed between said sander control valve and said brake cylinder pressure source, said series of valve means being responsive to a predetermined pressure and predetermined vehicle speed whereby upon normal brake application after said pressure and vehicle speed have both reached a predetermined minimum said sander control valve will be operated.

8. In a vehicle brake and sanding apparatus, the combination with fluid pressure actuated brakes for said vehicle, of sanding means, means for controlling the flow of fluid to said sanding means, means responsive to the speed of said vehicle operatively associated with said controlling means, means responsive to a predetermined pressure from said brake actuating pressure and also operatively associated with said controlling means, and selective means communicating with said controlling means, said selective means and said combined speed control and cylinder pressure actuated means being each respectively capable of actuating said controlling means under predetermined conditions.

9. In a vehicle braking and sanding apparatus, the combination with brakes mounted on said vehicle, of brake actuating pressure means, sanding means, means responsive to fluid from said brake actuating pressure means for controlling a flow of fluid to said sanding means from a reservoir, means responsive to the speed of said vehicle and operatively associated with said controlling means, said controlling means being responsive to fluid above a predetermined pressure, and means for admitting fluid to said controlling means from said brake actuating pressure means whereby upon normal brake application after said pressure and vehicle speed have reached a predetermined minimum said control means will be operated to allow the flow of fluid from said reservoir to said sanding means.

STEPHEN RICCIO.
WALTER P. JOHNSON.